June 21, 1938.  W. FUHRMANN ET AL  2,121,223
AMUSEMENT DEVICE
Filed April 7, 1937   5 Sheets-Sheet 1

INVENTORS
W. Fuhrmann &
W. G. Sand
BY John O. Seifert
ATTORNEY

June 21, 1938.  W. FUHRMANN ET AL  2,121,223
AMUSEMENT DEVICE
Filed April 7, 1937  5 Sheets-Sheet 3

Patented June 21, 1938

2,121,223

UNITED STATES PATENT OFFICE 2,121,223

AMUSEMENT DEVICE

Warren Fuhrmann, Kearny, and William G. Sand, Keansburg, N. J.

Application April 7, 1937, Serial No. 135,378

18 Claims. (Cl. 273—86)

This invention relates to amusement devices wherein a plurality of figures, which may simulate horseback riders, dogs, motor vehicles, such as automobiles or motor cycles, bicycles or human beings, are arranged to travel in concentric circular paths and means to propel the figures, and it is an object of the invention to provide an improved amusement device of this character wherein the figures in the normal position of rest of the device are caused to assume a position in alinement and the provision of means to propel the figures in circular paths and simultaneously alternately advance or accelerate and retract or retard the speed of movement of the figures one relative to the other whereby the element of racing may enter into the operation of the amusement device.

It is another object of the invention to provide in amusement devices of this character a turntable and a series of figure carrying arms pivotally supported in superposed relation to have individual or independent revolving movement about the axis of rotation of the turntable and normally urged to predetermined position to extend in parallel relation during the period of rest of the turntable, and the provision of means rotatable with the turntable to cause the arms to be revolved by the rotation of the turntable and simultaneously alternately advance or accelerate and retract or retard the movement of the arms relative to each other and the speed of travel of the turntable and cause the figure carrying arms to be arranged in different positions relative to each other upon a predetermined number of revolutions of the arms with the turntable.

It is a further object of the invention to provide in amusement devices of this character a turntable and power means to rotate the same together with means to lock the turntable against movement, manually operative means to release the locking means from the turntable and render the power means active to rotate the turntable, and means operative upon a predetermined number of revolutions of the turntable to render the power actuating means therefor inactive and cause the locking means to assume position to lock the turntable against movement.

It is another object of the invention to provide an improved amusement device including a turntable, a series of figure carrying arms pivotally supported to have revolving movement about the axis of the turntable one independent of the other and normally urged to alined position during the period of rest of the turntable, and the provision of means carried by the turntable to transmit the movement of the turntable to the arms and operative to alternately advance or accelerate and retract or retard the movement of the arms relative to each other and the speed of travel of the turntable, means to releasably lock the turntable against movement during the period of rest thereof, an electric motor having a driving connection with the turntable with circuit controlling means connected in the circuit thereof to render the motor active and inactive to actuate the turntable, manually operative means to release the locking means from the turntable and actuate the circuit controlling means to render the motor active to rotate the turntable, and means operative upon a predetermined number of revolutions of the turntable to cause the locking means to assume position to lock the turntable against movement and actuate the circuit controlling means to render the motor inactive.

Other objects of the invention will hereinafter appear.

In the drawings accompanying and forming a part of this application.

In carrying out the embodiment of the invention illustrated in the drawings there is provided a supporting base B, shown as of circular form having an axial upstanding portion B' having successively upward portions of reduced diameter and arranging said axial portion B' with annular shoulders b, b'. A hollow pillar or post P upon which the operative parts are mounted is engaged upon the portion of least diameter of the base portion B' with the end of the pillar abutting and supported upon the shoulder b.

Figures 3, 4:
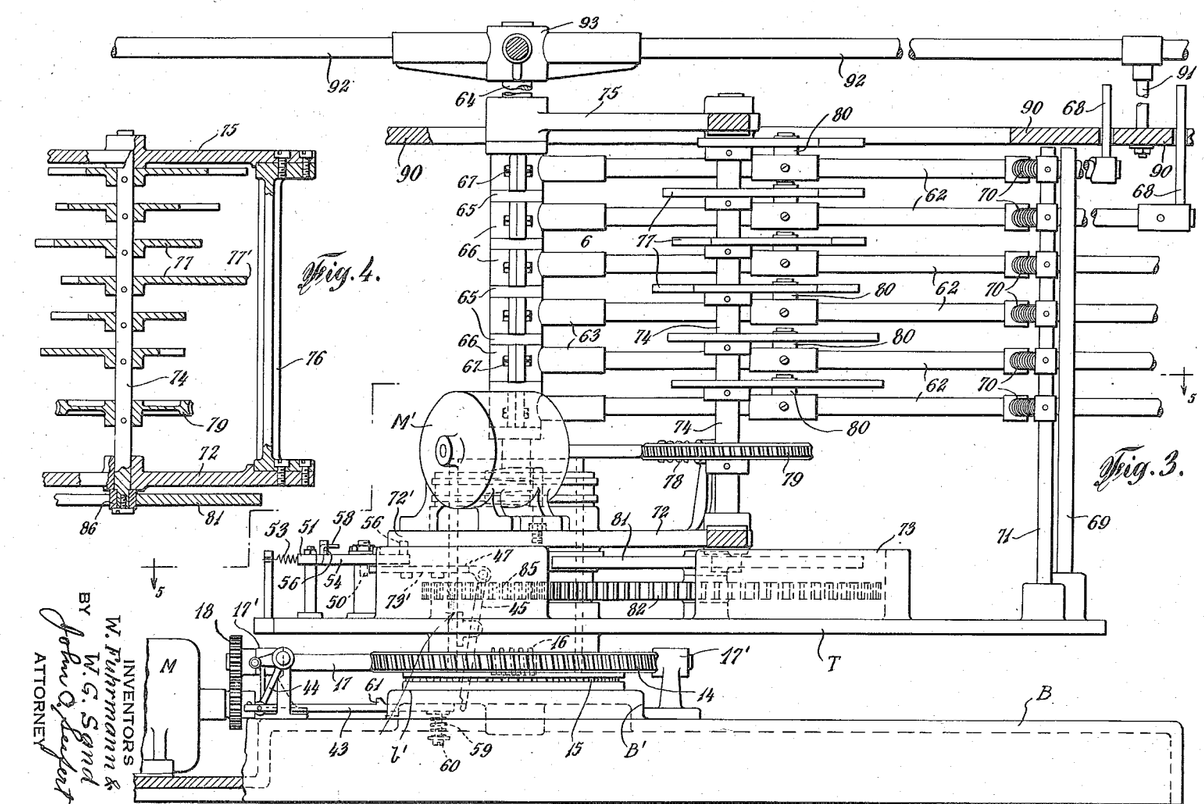
Figure 3 is a side elevation, on an enlarged scale and partly in section, of the operative means of the amusement device.
Figure 4 is a detail view in section of means rotatable with the turntable to transmit the movement of the turntable to the figure carrying arms and alternately advance or accelerate and retract or retard the movement of the figure carrying arms relative to each other and the speed of rotation of the turntable.

A turntable T of irregular contour has a hub portion whereby it is rotatably mounted on the pillar P, the turntable having a worm wheel 14 fixed on the hub thereof and whereby the table is supported through anti-friction bearing 15 upon the shoulder b' of the upstanding portion B' of the base B. The turntable is rotated in the direction indicated by the arrow in Figures 5 and 8 by a worm 16 on a shaft 17 journalled in bearings in brackets 17' fixed on the base B, (Figures 3, 5 and 8), and the worm carrying shaft 17 driven from a suitable source of power and shown as an electric motor M mounted in a recessed portion in the top of the base B and operatively connected to the shaft 17 by a gear fixed on the motor shaft meshing with a gear on the shaft 17, as shown at 18.

To render the motor M active and inactive to rotate the turntable circuit controlling means are connected in the electric circuit of the motor with a source of electric energy, and means are provided to manually actuate said circuit controlling means to close the motor circuit and means operative from and upon a predetermined number of revolutions of the turntable to actuate said manually operative means for the circuit controlling means to return the same to initial position and open the motor circuit.

Figures 5, 6, 7:
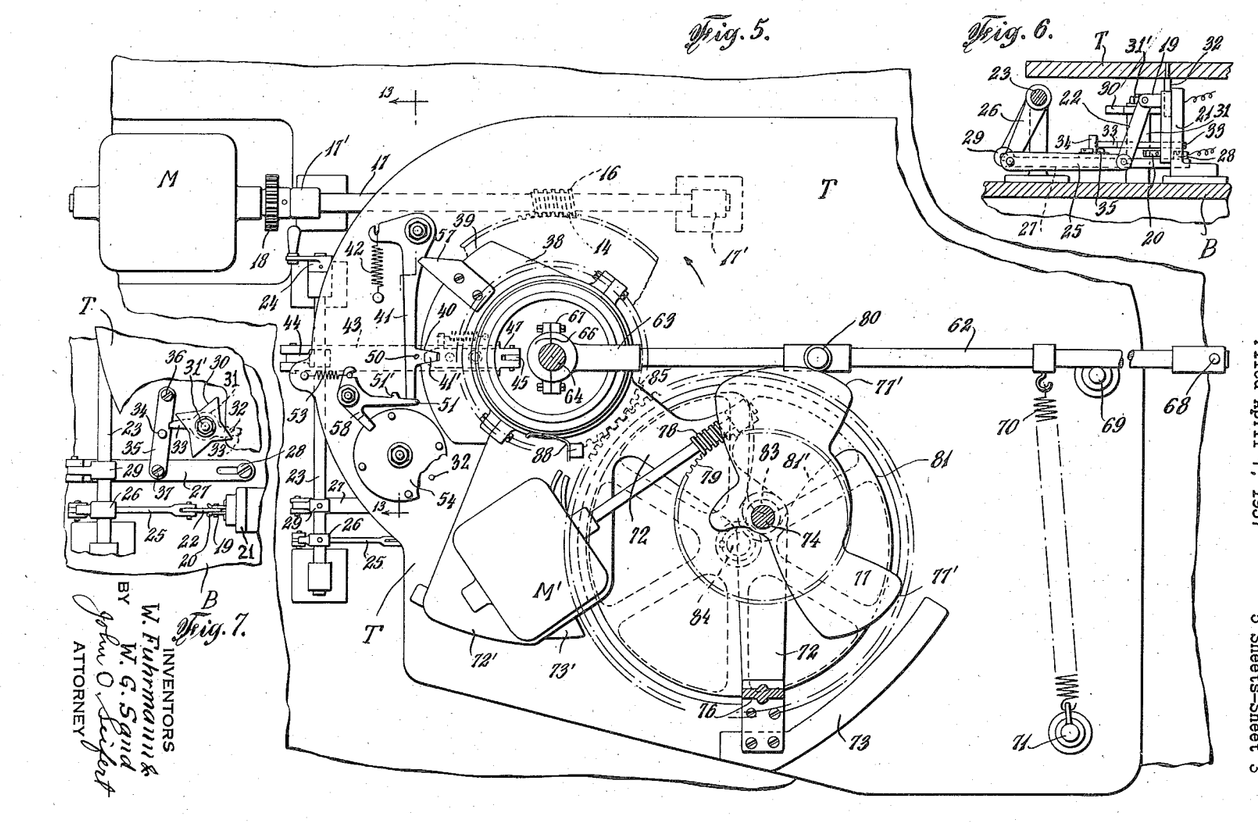
Figure 5 is a sectional view taken substantially on the line 5—5 of Figure 3 looking in the direction of the arrows and showing the operative parts in normal position of rest.
Figure 6 is a detail view in side elevation of the circuit controlling means for the electric driving motor for the turntable.
Figure 7 is a plan view of the circuit controlling means for the driving motor for the turntable and the means operative upon a predetermined number of revolutions of the turntable to actuate the circuit controlling means to open the motor circuit and actuate to normal position the manually operative means to actuate the circuit controlling means to close the motor circuit and release the locking means from the turntable.

The circuit controlling means for the motor M as shown in Figures 6 and 7 comprises a pair of contact terminals 19, 20 interposed in the circuit and carried by and insulated from a support 21 mounted on the base B below the turntable. Each of said contact terminals is provided with a bifurcated portion, as shown in Figure 7, with a circuit maker and breaker 22 pivotally connected to the bifurcated portion of the contact terminal 19 and adapted to be engaged within the bifurcated portion of the other contact terminal 20 to close the motor circuit. The circuit maker 22 is operatively connected to and actuated from a rock shaft 23, having a hand operating crank 24 fixed thereon, by a link 25 pivotally connected to an arm 26 fixed on the rock shaft 23. It will be obvious that by actuating the rock shaft 23 in one direction by the crank 24 that the circuit maker 22 will be placed into electrical connection with the contact terminal 20 and thereby close the circuit of motor M. The link 25 may be of insulating material or insulated from the circuit maker 22.

To actuate the manually operative means and the circuit maker 22 to circuit opening position upon a predetermined number of revolutions of the turntable, in the present instance upon each two revolutions of the turntable, a member or slide 27 is slidably mounted on the base B, as by a screw engaging a slot in said slide as shown at 28 in Figure 7, and the slide is pivotally connected to an arm 29 fixed on the rock shaft 23. A star wheel 30 having four projections is fixed to the upper end of a sleeve 31 mounted to rotate on a vertical axis on a stud 31' fixed in and extending upwardly from the base B and arranged so that the projections of the wheel will intersect the path of travel of and be engaged by a pin 32 fixed in and extending downwardly from the bottom of the turntable upon each revolution of the turntable and impart a one-quarter turn to said star wheel. A member having diametrically oppositely extending arms 33 is fixed to the lower end of the sleeve 31 to rotate with the star wheel 30 and adapted to be moved through an arc of 180 degrees upon each two revolutions of the turntable and engage a pin 34 fixed in and extending upwardly from an arm 35 pivotally mounted at one end, as at 36, on a pivot fixed in the base B and pivotally connected at the opposite end, as at 37, to the slide 27. In the normal position of the rock shaft 23 with the parts will be in their extreme left hand position as viewed in Figures 6 and 7 the circuit maker 22 out of contact with the contact terminal 20 and the slide 37 in position with the screw 28 engaging the outer end wall of the slot and the arm 35 positioned with the pin 34 carried thereby out of the path of movement of the arms 33. When the rock shaft 23 is actuated to close the circuit through the circuit maker 22 the slide 27 will be moved to its extreme right hand position and thereby actuate the arm to position the pin 34 carried thereby in the path of movement of the arms 33, and as said arms 33 are rotated through the star wheel 30 through an arc of 180 degrees one of said arms 33 will engage with the pin 34 fixed in the arm 35 and by the connection of said arm 35 with the rock shaft 23 through the slide 27 the rock shaft will be actuated to move the contact maker 22 out of contact with the contact terminal 20 and thus open the circuit of motor M thereby causing the motor to stop and arresting the movement of the turntable. The arms 33 are of a length and the face thereof that engages the pin 34 arranged to cause the pin 34 to ride along such face and the arms off from the pin as said arms 33 are revolved by the rotation of the star wheel 30.

Figures 10, 11, 12, 13:
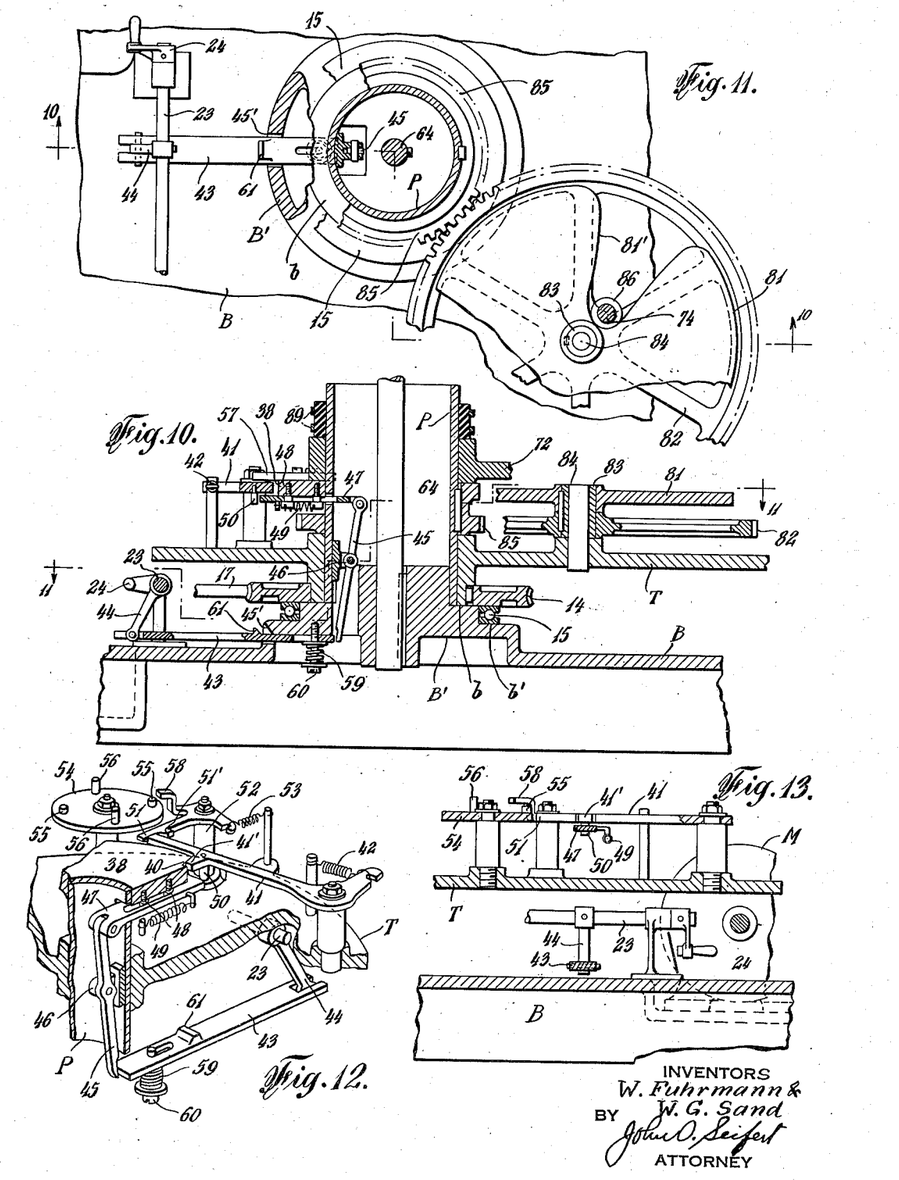
Figure 10 is a detail view in longitudinal section taken substantially on the line 10—10 of Figure 11 looking in the direction of the arrows and showing the mounting of the turntable, the means for locking the turntable against movement and the manually operative means for releasing the locking means from the turntable.
Figure 11 is a sectional view taken substantially on the line 11—11 of Figure 10 looking in the direction of the arrows.
Figure 12 is a detail view in perspective of the means to lock the turntable against movement showing the same in locking position, the manually operative means to release the locking means from the turntable and hold it in releasing position, and the means operative upon a predetermined number of revolutions of the turntable to release the locking means and permit the same to assume locking position.
Figure 13 is a detail view in perspective taken substantially on the line 13—13 of Figure 5 looking in the direction of the arrows, and showing the locking means for the turntable and the means to release said locking means to permit it to assume position to lock the turntable against movement.

Means are provided to releasably lock the turntable against movement during the period of rest and adapted to be actuated to unlocking position by the actuation of the circuit maker 22 to close the circuit of motor M. For this purpose a plate 38 is fixed on the pillar P having an arcuate edge 39 concentric with the axis of the pillar and arranged with a notch 40 therein intermediate its ends. A locking latch 41 is pivotally mounted on the turntable to have movement toward and away from the plate 38 and urged in a direction toward the plate by a spring 42, the latch having a nose 41' adapted to engage and travel relative to the arcuate edge 39 of the plate 38 and engage the plate notch 40 to hold the turntable against movement. To actuate the latch to release the latch nose 41' from the plate notch 40 when the circuit maker 22 is actuated to circuit making position by the operation of the rock shaft 23 a member or slide 43 is pivotally connected at one end to an arm 44 fixed on the rock shaft 23, the opposite end of the slide being slidably extended through an opening in the upstanding portion B' of the base B, as shown at 45'. As the rock shaft 23 is operated to move the circuit maker 22 to circuit closing position sliding movement is imparted to the slide 43 and the end of the slide opposite its connection with the arm 44 will engage one arm of a lever 45 pivotally mounted on a bracket 46 fixed on the inside of the pillar P. (Figures 10, 11 and 12.) The opposite arm of the lever 45 is pivotally connected to a slide 47 extended through an opening in the pillar P and slidably mounted on the under face of the plate 38 by screws extended through a slot in the slide and threaded into the plate 38, as shown at 48 in Figure 12, the slide 47 being arranged to have movement toward and away from and in a plane below the latch nose 41' and urged in a direction away from the latch 41 by a spring 49. As the rock shaft 23 is operated to actuate the circuit maker 22 to circuit closing position the slide 47 is actuated against the influence of the spring 49 toward the latch 41 by the slide 43 engaging the lever 45 connected to the slide 47 and during such movement of the slide 47 it engages a pin 50 fixed in and extending downwardly from the latch 41 and thereby moving the latch against the influence of its spring 42 and the latch nose 41' out of engagement with the plate notch 40. During the unlocking movement of the latch 41 it is caused to travel or move relative to a dog 51 pivotally mounted on a post 52 fixed in the turntable, the dog having a part urged into engagement with the end of the latch 41 by a spring 53, the movement of the latch causing the end to ride over and engage in back of a nose 51' on the dog and the latch retained in such position under the influence of the spring 53. To release the latch from the holding dog 51 to cause the latch nose 41' to engage the plate notch 40 and hold the turntable against movement when the circuit maker 22 is actuated to open the circuit of the motor M, means are provided to release the holding dog 51 from the latch 41, comprising a disk 54 supported by the turntable to rotate on a vertical axis and arranged with two series of pins each series including two pins 55, 56 equidistantly spaced about and arranged diametrically of the disk and arranged whereby as the disk is rotated with the turntable the travel of the disk pins is intersected by a member 57 fixed to and projecting from the arcuate edge 39 of the plate 38 with a side edge thereof inclining from the arcuate edge of the plate 38 toward the end of said member 57 and adapted to successively engage the pins 55, 56 upon successive revolutions of the turntable and thereby rotate the disk successively a one-quarter revolution upon each revolution of the turntable. The pins 56 are of greater length than the pins 55 and as the disk is rotated through an arc of 180 degrees one of the longer pins 56 will engage a projection 58 extended from the dog 51 into the path of travel of the disk pins 56 and thereby move the dog 51 against the influence of its spring 53 out of engagement with the latch 41 and permit the latch 41 to be moved under the influence of its spring 42 to engage the latch nose 41' into engagement with the plate notch 40. The pins 55 are of a length so that they will pass below the dog projection 58. The slide 47 to actuate the latch 41 to unlocking position is actuated prior to the contacting of the circuit maker 22 with the contact terminal 20, and to permit of continued movement of the actuating slide 43 for the lever 45 the end of slide 43 that is engaged with the arm of lever 45 is urged in an upward direction by a spring 59 coiled about a screw 60 extended through a slot in the slide 43 (Figure 10) and threaded into the extended portion B' of the base B and the spring confined between a washer on the screw and the slide 43. To move the slide 43 out of engagement with the arm of lever 45 to permit of continued movement of the slide 43 the upper wall of the opening in the base through which the slide 43 is extended is inclined, and a projection 61 extended upward from the upper face of the slide 43 has the upper surface inclined to correspond with the inclination of the upper wall of the opening through which the slide 43 extends and as the slide is moved inward and the inclined face of the slide projection 61 engages said upper inclined wall of the opening, the slide is moved downwardly against the influence of the spring 59 and thus permit the slide to pass below the end of the arm of the lever 45 and said lever 45 and the slide 47 returned to normal position by the spring 49.

A series of arms or sweeps 62, shown in the present instance as six in number although a greater or less number may be used, are mounted in carriers 63 therefor, which carriers have a semi-circular portion at the end opposite the arm supporting portion with flanges extending oppositely from said circular portion and whereby the carriers 63 are mounted in superposed relation to individually or independently revolve about a shaft 64 fixed at one end in the upstanding portion B' of the base B to extend axially through and above the pillar P. The arm carriers 63 are mounted on the shaft 64 supported upon collars 65 and fixed on the shaft by semi-circular members 66 embracing the shaft opposite the circular portion of the arm carriers, said member being arranged with oppositely extending flanges and secured to the circular portion of the arm carriers 63 by bolts extended through openings in the flanges of the circular portion of the arm carriers and the members 66, as at 67.

Figure 2:
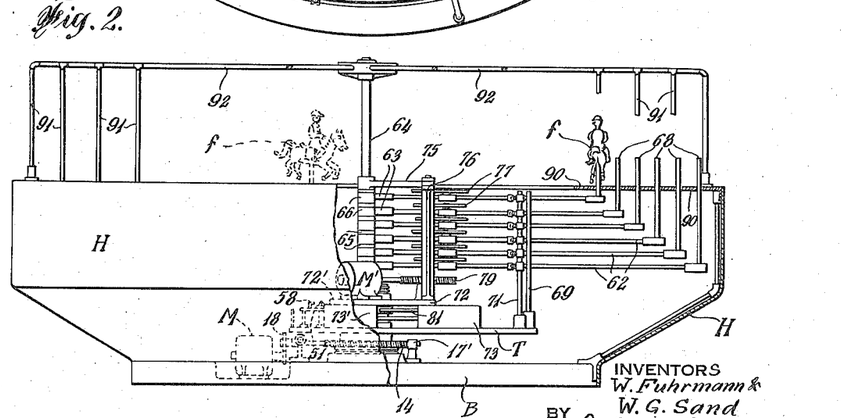
Figure 2 is a side elevation with a portion of an enclosing housing for the operative mechanism broken away.

The arms 62 are of different lengths with the shortest arm uppermost and the successive lower arms increased in length of substantially equal increments of length and each arm carries at the outer end a vertically extending stem 68 of a length so that all of the stems terminate in the same horizotal plane and spaced apart radially substantially equal distances, as clearly shown in Figure 2. Each of the arm stems 68 carries a figure f whereby the figures carried by the respective arms 62 by the revolving movement of said arms about the shaft 64 are propelled through concentric circular paths. These figures f are shown to simulate horseback riders, but they may be in simulation of other objects or figures, such as dogs, motor cars or cycles, bicycles or of a human being.

The turntable is rotated in the direction indicated by the arrow and the arms 62 are urged in a direction opposite to the direction of rotation of the turntable into engagement with an abutment forwardly thereof in the direction of rotation of the turntable, said abutment being in the form of a post 69 fixed in and extending vertically from the turntable, and the arms urged individually toward the abutment by springs 70 attached at one end to the arms and at the opposite end to a post 71 fixed in and extending vertically from the turntable. The arms 62 extend in parallel relation when in engagement with the abutment 69 during the period of rest of the turntable at the starting or commencement point of the operation of the amusement device.

Figures 8, 9:
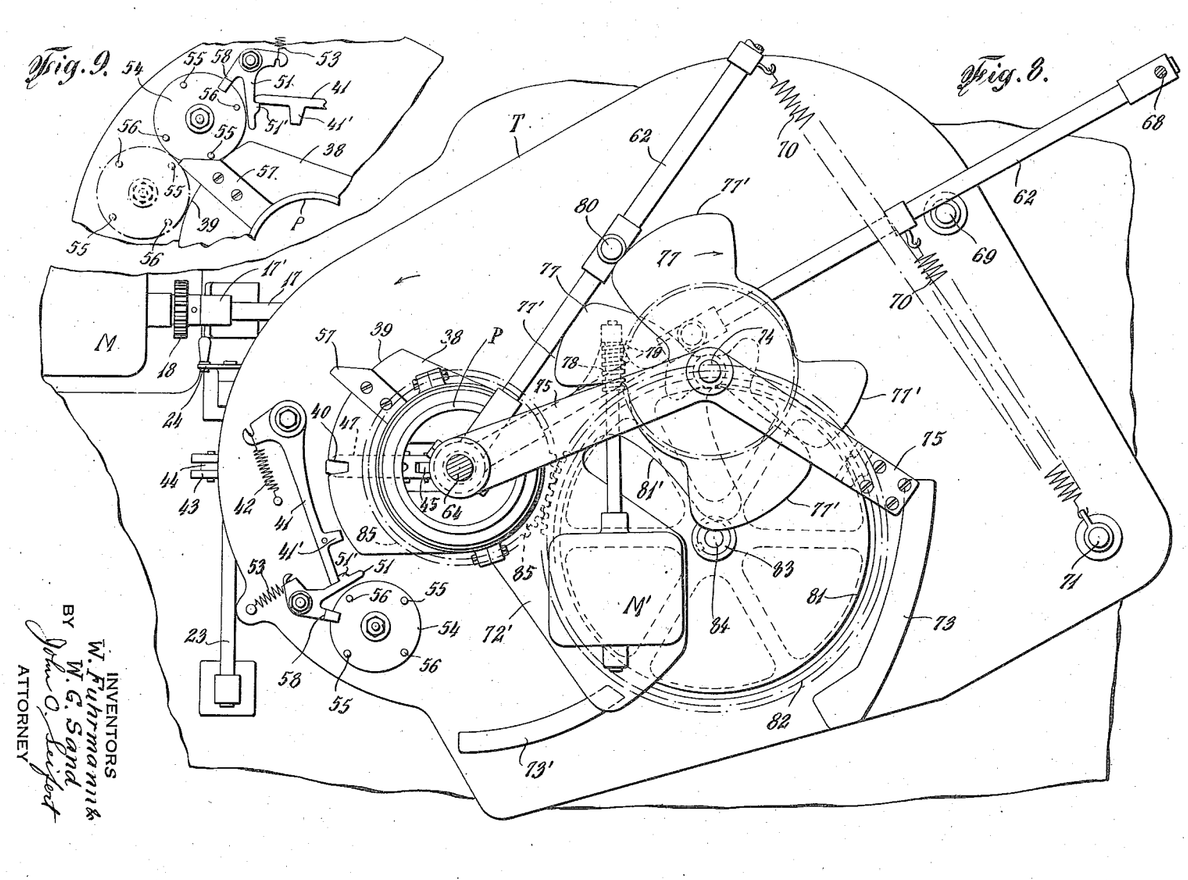
Figure 8 is a view similar to Figure 5 but showing the parts in operative positions.
Figure 9 is a detail view in plan of the means operative upon a predetermined number of revolutions of the turntable to release the locking means for the turntable and permit the locking means to assume position to lock the turntable against movement.

As the rock shaft 23 is manually actuated to actuate the locking latch 41 to release the turntable and actuate the circuit maker 22 into contact with the contact terminal 20 to render the operating motor M active to rotate the turntable, means are provided to move the arms 62 out of engagement with the abutment 69, transmit the rotary movement of the turntable to the arms and simultaneously with the revolving of the arms 62 about the shaft 64 by the rotation of the turntable alternately advance or accelerate and retract or retard the movement of the arms relative to each other and the rotation of the turntable. For this purpose a bracket having a pair of arms 72, 72' is mounted on the pillar P to revolve about the same with the turntable, the arms 72, 72' being supported at the outer ends upon members 73, 73' fixed to and extending upward from the turntable. A shaft 74 is supported at one end in the arm 72 to rotate on a vertical axis and rotatably supported at the upper end in an arm 75 rotatably engaged on the shaft 64 above the arms 62 and connected in spaced relation to the bracket arm 72 by a member 76 secured at the opposite ends to the arms 72, 75, as clearly shown in Figure 4. A series of superposed cams 77, one associated with each of the arms 62, are fixed on the shaft 74 to rotate in planes parallel to and above the arms 62, the cams being mounted on the shaft 74 in circular spaced relation one relative to the other; that is, the high portions 77' of the cams are spaced in angular relation one relative to the other, as shown in Figure 8. The cam carrying shaft 74 is continuously rotated; that is, during the periods of rest and rotation of the turntable, by an electric motor M' fixed on the bracket arm 72' and operatively connected with the cam carrying shaft 74 by a worm 78 on the motor shaft meshing with a worm wheel 79 fixed on the cam shaft 74.

Figure 1:
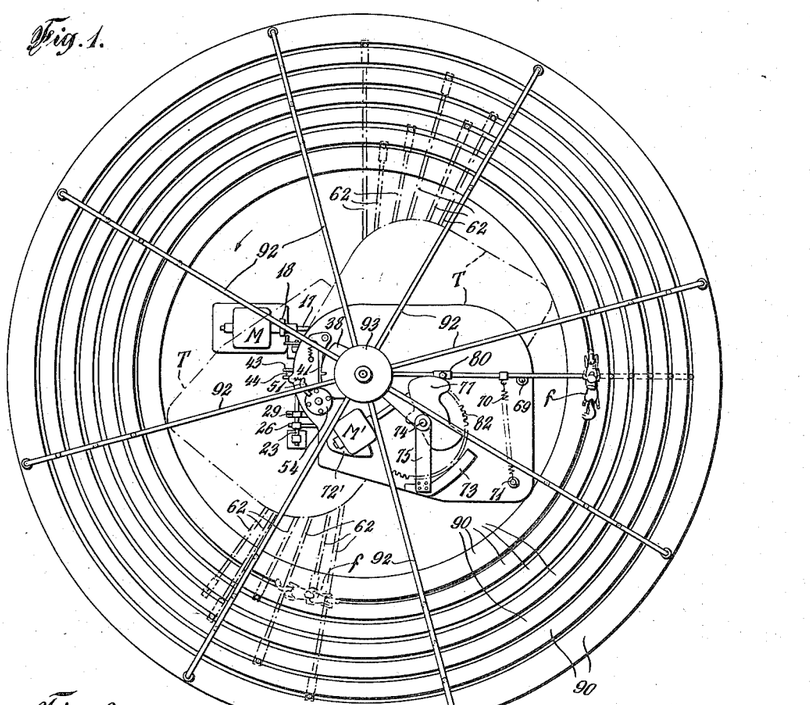
Figure 1 is a plan view of the amusement device showing an embodiment of the invention.

In the normal position of the parts wherein the turntable is locked against movement by the latch 41 and the motor M is inactive by the opening of the circuit thereof by the circuit maker 22 and the figure carrying arms 62 are positioned in line and in engagement with the abutment 69 forward of the direction of rotation of the turntable by the springs 70 and the cam carrying shaft 74 positioned with the cams rearwardly of the figure carrying arms in such position. When the device is set in operation by the manual operation of the rock shaft 23 to release the locking latch 41 and to actuate the circuit maker 22 into contact with the contact terminal 20 to render the motor M active, means carried by the turntable and operative from the rotation thereof are actuated to move the cam carrying shaft 74 relative to the turntable in the direction of rotation thereof and cause the cams to engage the cam following rollers 80 carried by the arms 62 and thereby move said arms out of engagement with the abutment 69, said means comprising a disk 81, having a cam groove 81' therein, fixed with a gear 82 on a bushing 83 rotatable on a vertical stud 84 fixed in the turntable, as shown in Figure 10. To rotate the gear 82 and therewith the cam disk 81 by the rotation of the turntable the gear 82 meshes with a pinion 85 fixed on the pillar P above the turntable. A roller 86 mounted on the end of the cam carrying shaft 74 below the bracket arm 72 is adapted to follow the cam disk 81. In normal position of rest of the parts the cam following roller 86 engages in the cam groove 81', as shown in Figures 5 and 11. As the turntable commences to rotate the cam disk 81 and thereby the cam carrying shaft 74 is caused to rotate therewith, and as the cam disk 81 is rotated by the revolving of the gear 82 about the pinion 85 by the arrangement of the edge of the cam groove 81' the cam carrying shaft 74 is moved substantially radially outward from the cam groove and the cam following roller carried by the cam carrying shaft is caused to follow the peripheral edge of the disk and such movement of the cam carrying shaft positioning the figure carrying arms 62 out of engagement with the abutment 69 and the cams 77 by the rotation thereof and due to the circular spacing of the cams on the shaft 74 successively and alternately advance or accelerate and retract or retard the movement of the figure carrying arms 62 one relative to the other and direction of rotation of the turntable. By the participating revolving movement of the cam carrying shaft 74 with the rotation of the turntable and the rotation of the cams 77 during the revolving movement of the same with the cam carrying shaft 74 the figure carrying arms 62 and thereby the figures will be variably positioned, as shown, for instance, in Figure 1, wherein the figure carried by the lowermost or longest arm 62, as shown at the top of Figure 1, is forward of the other figure carrying arms. The next successive figure is the one carried by the uppermost or shortest arm 62. The third figure is the one carried by the arm 62 next to the topmost arm. The fourth figure is carried by the arm next to the lowermost arm. The fifth figure is carried by the third arm from the top, and the last figure is carried by the third arm from the bottom. As compared with the positions of the figures f as shown in the lower portion of Figure 1 the figure f carried by the lowermost or longest arm 62 is foremost. The figure carried by the uppermost or shortest arm is second in position. The figure carried by the second arm from the bottom is third in position. The figure carried by the second arm from the top is fourth. The figure carried by the third arm from the bottom is fifth, and the figure carried by the third arm from the top is last. This alternate advancing and retracting of the figure carrying arms is continued during a predetermined number of revolutions of the turntable, in the present instance as shown during two revolutions of the turntable, and will be continued until the termination of the second revolution of the turntable with the figures positioned forward of the abutment 69 with one of the figures forward of the others, and indicating means may be provided that is actuated by the leading figure in a predetermined position thereof to indicate which of the figures was in the lead at the termination of the rotation of the turntable. The position of the figures continuously vary one relative to the other during the rotation of the turntable due to the continuous rotation of the cam carrying shaft 74, so that a different figure will be in the lead at the termination of the successive operations of the device. Should it be desired that the element of a contest or race enter into the operation of the amusement device the figure in the lead just prior to the return of the figure carrying arms into engagement with the abutment 69 at the termination of the operation of the device may be considered the winner. Just prior to the termination of the second revolution of the turntable the means to actuate the circuit maker 22 to position to open the motor circuit is operated through the means hereinbefore described and in successive sequence therewith the locking latch 41 is released from its holding dog 51 and caused to assume position to engage the latch nose 41' in the plate notch 40 to hold the turntable against movement, and in such position of the turntable the cam disk 81 will be in position with the cam groove or recess 81' in line with the cam following roller 86 carried by the cam carrying shaft 74 and through the influence of the arm springs 70 the arms cause the roller 86 to engage in the cam groove 81' in the disk 81 and the arms 62 into engagement with the abutment 69, the parts remaining in such positions until the rock shaft 23 is again operated to actuate the circuit maker 22 to close the circuit of motor M and release the locking latch 41 from the turntable.

To electrically connect the motor M' with a source of electric energy brushes 88 in electrical connection with the motor (Figure 5) having rubbing contact with conductor rings mounted on and insulated from the pillar P, as shown at 89 in Figure 10, which rings are connected with the source of electric energy.

To enclose the operating parts of the amusement device a housing H is mounted and supported on the base B to extend upwardly therefrom and about the operating parts. To conceal the connection of the figure carrying stems with the arms 62 a series of annular concentrically arranged and radially spaced plates 90 are provided, the outermost of which plates extends inwardly from the top of the housing H. The plates 90 are suspended and supported by members 91 connected to and extending downwardly from arms 92 fixed at one end and extending radially from a head 93 fixed on the shaft 64.

It will be obvious that various modifications may be made in the construction of the parts without departing from the scope of the invention, and that portions of the invention may be used without others and come within the scope of the invention.

Having described our invention, we claim:

1. In an amusement device, a turntable arranged with a fixed abutment excentrically thereof, a series of figure carrying arms supported in superposed relation to have revolving movement about the axis of the turntable independent of each other and the rotation of the turntable forwardly of the abutment, means to yieldingly urge the arms in a direction opposite to the direction of rotation of the turntable toward and into engagement with the abutment during the period of rest and commencement of rotation of the turntable, rotatable means positioned in the rear of the abutment supported to revolve about the axis of the turntable and participate in the rotation of the turntable and have movement in a direction toward and away from the arms and move the arms out of engagement with the abutment and transmit the rotation of the turntable to the arms and operative by the rotation thereof to advance and retract the arms relative to each other as the arms are revolved by the rotation of the turntable, and means carried by and rotatable from the rotation of the turntable operative to connect the rotatable means with the turntable and move said rotatable means toward and the arms out of engagement with the abutment, and the rotatable means in said position operative to alternately advance and retract the arms relative to each other and travel of the turntable during the revolving of the arms by the rotation of the turntable.

2. In an amusement device, a turntable arranged with an abutment fixed eccentrically to and extending parallelly of the axis of the turntable, a series of arms supported in superposed relation to have independent revolving movement about the axis of the turntable forwardly of the abutment, means to yieldingly urge the arms in a direction opposite to the direction of rotation of the turntable toward and into engagement with the abutment during the period of rest and commencement of rotation of the turntable, a bracket supported to revolve about the axis of the turntable, a series of juxtaposed and connected cams equal in number to the number of the arms carried by said bracket rearwardly of the arms to rotate on an axis extending parallelly of the axis of the turntable, means carried by and rotated from the rotation of the turntable operative to connect and rotate the bracket from the rotation of the turntable and during the initial rotation of the turntable actuate the cam carrying bracket to move the arms by the cams out of engagement with the abutment against the action of the yielding means and retain the arms in said position during a predetermined number of revolutions of the turntable, and the cams in said position being operative to alternately advance and retract the arms relative to each other and rotation of the turntable.

3. An amusement device as claimed in claim 2, wherein the means to yieldingly urge the arms toward and into engagement with the abutment comprises a spring for each arm attached at one end to the arm and the opposite end attached to the turntable, and said yielding means being operative to cause a roller carried by the arms to follow the cams and to move the cam carrying bracket to normal position when the arms are urged by the springs into engagement with the abutment.

4. In an amusement device, a turntable arranged with a fixed abutment eccentrically of and extending parallelly of the axis of the turntable, a series of arms supported in superposed relation to have independent revolving movement about the axis of the turntable forwardly of the abutment in the direction of rotation of the turntable, means to yieldingly urge the arms in a direction opposite to the direction of rotation of the turntable toward and into engagement with the abutment during the period of a rest and commencement of rotation of the turntable, a series of juxtaposed connected cams equal in number to the number of arms supported in the rear of the abutment to rotate on an axis extending parallelly of the axis of the turntable and revolve about the axis of the turntable, means carried by and rotatable from the rotation of the turntable operative to transmit the movement of the turntable to the cams and move said cams in a direction toward and the arms out of engagement with the abutment and in said position of the cams and arms alternately advance and retract the arms relative to each other and the travel of the turntable and permit the arms to move the cams to position with the arms engaging the abutment upon a predetermined number of revolutions of the turntable, means to releasably lock the turntable in position of rest and normally urged to locking position, means to release the locking means from the table and retain it in said position, and means operative upon a predetermined number of revolutions of the turntable to release the locking means from its retaining means and permit the locking means to assume position to lock the turntable against movement.

5. In an amusement device, a turntable having a fixed abutment eccentrically of the axis thereof, a series of superposed figure carrying arms supported to have independent revolving movement about the axis of the turntable, a spring for each arm to individually urge the arms in a direction toward and into engagement with the abutment during the period of rest and commencement of rotation of the turntable, a cam rotatably carried by the turntable, a pinion fixed concentrically of the turntable, a gear rotatable with the cam meshing with the pinion adapted to be rotated from the pinion by the rotation of the turntable, said pinion and gear being arranged to impart one revolution to the gear and cam upon each predetermined number of revolutions of the turntable, a bracket supported to revolve about the axis of the turntable and superposed to the gear and cam, a series of juxtaposed and connected cams one for each arm supported by the bracket to rotate on an axis parallelly of the axis of the turntable, said cams being circumferentially spaced relative to each other and carry a roller to follow the cam rotatable with the gear and cause the cam carrying bracket to revolve with the table, a roller carried by each arm adapted to follow the cam of the juxtaposed associate with the arm under the influence of the yielding means to urge the arms toward the abutment, a motor carried by the bracket operatively connected with the juxtaposed cams and continuously rotate the same, and the cam carried by the turntable rotatable with the gear being operative during the comencement of rotation of the turntable to move the cam carrying bracket and cams toward the arms and the arms out of engagement with the abutment and the juxtaposed cams in said position by the rotation thereof alternately advance and retract the arms relative to each other and the rotation of the turntable, and the cam carried by the gear being arranged to permit the cam carrying bracket upon a revolution of the cam to be moved by the arm springs through the arms to position with the arms engaging the abutment.

6. In an amusement device, a turntable, a series of superposed figure carrying arms supported to independently revolve about the axis of the turntable, a series of juxtaposed and connected cams one for each arm supported rearwardly of the arms in the direction of rotation of the turntable, said cams being circumferentially spaced relative to each other and rotatable on an axis extending parallelly of the axis of the turntable and to revolve about the axis of and participate in the rotation of the turntable, springs to urge the arms in a direction toward the juxtaposed cams, a roller carried by each arm to follow the cam associated with the arm, and said cams being operative to permit the arms to assume a position in alinement during the period of rest and commencement of rotation of the turntable and to alternately advance and retract the arms relative to each other and the rotation of the turntable during the revolving movement of the arms with the rotation of the turntable, means to releasably lock the turntable against movement during the period of rest of the turntable and normally urged to locking position, means to release the locking means from the turntable, means to retain the locking means in position to release the turntable, and means operative upon a predetermined number of revolutions of the turntable to actuate the retaining means to release the locking means and permit the locking means to assume position to lock the turntable against movement.

7. In an amusement device, a turntable, a series of superposed arms supported to independently revolve about the axis of the turntable, a series of juxtaposed and connected cams one for each arm supported rearwardly of the arms in the direction of rotation of the turntable, said cams being circularly spaced relative to each other and rotatable on an axis extending parallelly of the axis of the turntable and to revolve about the axis of and participate in the rotation of the turntable, springs to urge the arms in a direction toward the cams, a roller carried by each arm to follow a cam of the juxtaposed cams, and said juxtaposed cams being operative to permit the arms to assume a position in alinement during the period of rest of the turntable and commencement of rotation thereof and to alternately advance and retract the arms relative to each other and the rotation of the turntable during the revolving movement of the arms with the rotation of the turntable, a plate rotatable with and about the axis of the turntable having an arcuate edge with a notch therein, a spring influenced latch having a nose to follow the arcuate edge of said plate and engage in the notch therein to lock the turntable against rotation in the position of rest thereof, means operative to actuate the latch to position with the latch nose out of engagement with the plate notch and release the turntable, a spring influence dog to engage and retain the latch in releasing position against the action of its spring influenced means, and means operative upon a predetermined number of revolutions of the turntable to release the dog from the latch and permit the latch to be actuated by its spring influenced means to engage the latch nose in the plate notch and lock the turntable against rotation.

8. In an amusement device as claimed in claim 7, actuating means to rotate the turntable, means operative from the means to release the locking latch to render the turntable actuating means active to rotate the turntable, and means operative upon the predetermined number of revolutions of the turntable to release the retaining dog from the locking latch to operate the means to actuate the locking latch to releasing position to return said means to initial position and render the actuating means for the turntable inactive.

9. An amusement device as claimed in claim 7, wherein the means to release the latch retaining dog from and permit the latch to assume its locking position to hold the turntable against movement, comprises a rotatable disk having two series of pins circularly spaced about and projecting from the disk, one series of pins being of less length then the other series and alternating with the series of pins of greater length and said dog having a part projecting therefrom intersecting the path of movement of the pins, and a finger rotatable with the turntable adapted upon each revolution of the turntable to engage a disk pin and rotate the disk through a predetermined arc and the pins of greater length adapted to engage the latch retaining dog and release said dog from the locking latch.

10. An amusement device as claimed in claim 7, wherein a pin is fixed in and extends laterally of the latch nose, and the means to move the locking latch to position with the latch nose out of engagement with the plate notch comprises a slide supported at one side of the latch nose to have sliding movement in a direction toward and away from the latch nose and normally urged to position away from the latch nose and adapted by the movement of the slide in the opposite direction to engage the pin projecting from the latch nose and move the latch to releasing position, a pivoted lever pivotally connected at one arm to the slide, a manually operative rock shaft, and a second slide connected to and operative from said rock shaft to engage the other arm of the lever and actuate the lever to move the first slide against the action of its spring into engagement with the latch pin and thereby move the latch nose out of engagement with the plate notch and the latch to position for engagement by the latch retaining dog to retain the latch in table releasing position.

11. In an amusement device, a turntable, a series of figure carrying arms supported in superposed relation to have revolving movement about the axis of the turntable and move the figures in concentric circular paths, a series of juxtaposed and connected cams one for each arm supported to rotate in a plane parallelly of the arms and revoluble about the axis of the turntable, means carried by the turntable operative to connect the cams with and revolve the same about the axis of the turntable by the rotation of the turntable and move the cams into engagement with and revolve the figure carrying arms about the axis of the turntable, and said cams being operative by the rotation thereof to impart accelerating and retarding movements to the arms relative to each other during the revolving movement thereof with the turntable.

12. In an amusement device as claimed in claim 11, an electric motor operatively connected to and revoluble with the cams about the axis of the turntable and continuously rotating the juxtaposed cams, an electric motor having a driving connection with the turntable, a circuit closer connected in the circuit of the motor, manually operative means to actuate said circuit closer to circuit closing position, and means operative upon a predetermined number of revolutions of the turntable to actuate said circuit closer to circuit opening position.

13. In an amusement device as claimed in claim 11, an electric motor operatively connected to and revoluble with the juxtaposed cams about the axis of the turntable and continuously rotating the juxtaposed cams, an electric motor having a driving connection with the turntable, a circuit closer connected in the circuit of said second motor, manually operative means to actuate said circuit closer to circuit closing position, and means operative upon a predetermined number of revolutions of the turntable to actuate said circuit closer to circuit opening position, comprising a pair of contact terminals connected in the circuit, a contact maker to engage and electrically connect said contact terminals to close the circuit, said contact maker being connected to and operative from the rock shaft when said shaft is actuated to move the locking latch to position to release the turntable, oppositely extending pawls rotatable about an axis parallelly of the axis of the turntable, a star wheel rotatable with said pawls adapted to be engaged by and rotated with the pawls through a predetermined arc by a fixed part of the turntable and upon each revolution of the turntable, and a link connected to the rock shaft having a pin fixed in and extending laterally therefrom to intersect the path of movement of and be engaged by the pawls and actuated by the rotation of the pawls to actuate the rock shaft to move the contact maker out of contact with the contact terminals.

14. In an amusement device, a turn table arranged with an abutment extending eccentrically therefrom, a series of figure carrying arms supported in superposed relation to have revolving movement about the axis of the turntable, springs to urge said arms individually in a direction opposite to the direction of rotation of the turntable and into engagement with the abutment in alined position during the period of rest of the turntable, a series of juxtaposed connected cams, one for each arm supported to rotate about an axis parallelly of the axis of the turntable and in horizontal planes parallelly of the arms, means to continuously rotate said cams, means carried by the turntable to connect said cams with and revolve the same from the rotation of the turntable about the axis of the turntable and operative from the turntable to position the cams during the period of rest of the turntable to permit the arms to move into engagement with the abutment and upon the commencement of rotation of turntable actuate the cams to move the arms out of engagement with the abutment and revolve the arms from the turntable during the rotation thereof, and said cams in said position adapted by the rotation thereof to alternately advance and retract the arms relative to each other during the revolving of the arms, and said means being operative to retain said cam actuating means with the cams in said position for a predetermined number of revolutions of the turntable and permit the cams to be actuated by the arms under the influence of the arm springs to position to permit the arms to engage the abutment.

15. In an amusement device as claimed in claim 14, actuating means for the turntable, means to lock the turntable against movement in the position of rest of the turntable, manually operative means to actuate the locking means to release the turntable and render the actuating means for the turntable active, means for holding the locking means in unlocking position, and means operative upon the predetermined revolutions of the turntable to actuate the holding means to release and permit the locking means to assume position to lock the turntable against movement and render the actuating means for the turntable inactive.

16. In an amusement device as claimed in claim 14, means to lock the turntable against movement in the position of rest thereof and normally urged to locking position, an electric motor having a driving connection with the turntable, a circuit closer in the circuit of the motor, manually operative means to actuate the locking means to unlocking position and the circuit closer to circuit closing position, means adapted to be engaged by the locking means in the unlocking position thereof and retain the locking means in said position, means operative upon the predetermined number of revolutions of the turntable to actuate the retaining means for the locking means to permit the latter to assume locking position, and means operative in synchronism with the means to actuate the retaining means to release the locking means to actuate the circuit closer to circuit opening position.

17. In an amusement device, a turntable comprising a disk, an abutment fixed eccentrically in and extending upwardly from said disk parallel to the axis of rotation thereof, a series of figure carrying arms pivotally supported in superposed relation to each other concentrically of the axis of rotation of the turntable to have revolving movement independently of each other and the turntable; a spring for and to urge each arm in a direction opposite to the direction of rotation of the turntable into engagement with the abutment forward thereof in the direction of rotation of the turntable during the period of rest of the turntable, cams supported rearwardly of the arms to have revolving movement about the axis of the turntable and rotate on an axis extending parallelly of the axis of the turntable and into engagement with which cams the arms are urged by the springs, means to rotate the cams carried by the turntable, and means carried by the turntable rotatable on an axis parallel to and rotatable from the rotation of the turntable to transmit the rotary movement of the turntable to revolving movement of said cams about the axis of the turntable, and said cams being operative by the rotation thereof and during the revolving movement thereof with the rotation of the turntable to transmit the rotary movement of the turntable to revolving movement of the arms and by the rotation of the cams impart independent movement to the arms to alternately accelerate and retard the movement of the figure carrying arms relative to each other and the travel of the turntable.

18. In an amusement device, a turntable comprising a disk, an abutment fixed in the disk eccentrically to and extending parallelly of the axis of rotation thereof, a series of arms supported in superposed relation to each other and the turntable to revolve independently about the axis of the turntable forwardly of the abutment in the direction of rotation of the turntable and each arm carrying a figure arranged on the arms to revolve in concentric circles by the revolving of the arms, a series of connected and superposed cams corresponding in number to the number of the arms rotatable on an axis parallelly of the axis of the turntable and revoluble about the axis of the turntable operative to transmit the rotary movement of the turntable to revolving movement of the arms, a motor carried by the turntable operatively connected to the cams to rotate the same to alternately accelerate and retard the movement of the arms relative to each other and the turntable simultaneously with the revolving of the arms by the rotation of the turntable, means to yieldingly urge the arms in a direction opposite to the direction of rotation of the turntable to maintain the arms in engagement with the cams and aline the arms with the abutment, a cam carried by and rotatable from the rotation of the turntable, a cam follower carried by the series of cams to engage said latter cam to transmit the rotary movement of the turntable to revolving movement of the cams and actuate the cams to position the arms out of engagement with the abutment and cause the arms to be engaged with the abutment by the yielding means upon a predetermined number of revolutions of the turntable.

WARREN FUHRMANN.
WILLIAM G. SAND.